(12) United States Patent
Campbell

(10) Patent No.: US 9,119,351 B1
(45) Date of Patent: Sep. 1, 2015

(54) SOIL REPLACEMENT METHOD AND SYSTEM FOR SEED GERMINATION AND AGRICULTURAL GROWING

(76) Inventor: Richard Campbell, Washington, DC (US)

( * ) Notice: Subject to any disclaimer, the term of this patent is extended or adjusted under 35 U.S.C. 154(b) by 527 days.

(21) Appl. No.: 13/385,248

(22) Filed: Feb. 10, 2012

Related U.S. Application Data

(60) Provisional application No. 61/457,254, filed on Feb. 11, 2011.

(51) Int. Cl.
*A01G 1/00* (2006.01)

(52) U.S. Cl.
CPC ....................................... *A01G 1/002* (2013.01)

(58) Field of Classification Search
USPC .......................... 405/38; 47/62 N, 1.01 F, 65.9
See application file for complete search history.

(56) References Cited

U.S. PATENT DOCUMENTS

| 2,158,952 A | * | 5/1939 | Timberlake | ................. | 47/1.01 F |
| 2,632,979 A | * | 3/1953 | Alexander | ................. | 47/1.01 F |
| 3,479,825 A | * | 11/1969 | Hellstrom | ...................... | 405/38 |
| 3,890,910 A | * | 6/1975 | Angruner | ...................... | 111/200 |
| 4,067,712 A | | 1/1978 | Willard | | |
| 4,140,421 A | | 2/1979 | Lloyd | | |
| 4,148,155 A | | 4/1979 | Allen | | |
| 4,171,968 A | | 10/1979 | Farone | | |
| 4,329,812 A | | 5/1982 | Carlisle | | |
| 4,399,634 A | | 8/1983 | O'Hare | | |
| 4,584,791 A | | 4/1986 | Wolf | | |
| 4,630,394 A | | 12/1986 | Sherard | | |
| 4,913,596 A | * | 4/1990 | Lambert, III | ................. | 405/43 |
| 5,017,040 A | * | 5/1991 | Mott | ................. | 405/36 |
| 5,064,308 A | * | 11/1991 | Almond et al. | ................. | 405/43 |
| 5,492,434 A | * | 2/1996 | Adams et al. | ................. | 405/36 |
| 5,557,885 A | | 9/1996 | Sledge | | |
| 5,675,929 A | * | 10/1997 | Sontea et al. | ................. | 47/18 |
| 6,250,010 B1 | * | 6/2001 | Behrens | ................. | 47/56 |
| 7,169,224 B2 | * | 1/2007 | Li et al. | ................. | 106/644 |
| 7,485,171 B2 | | 2/2009 | Lynch | | |
| 8,001,721 B2 | | 8/2011 | Okamoto | | |
| 8,365,467 B1 | * | 2/2013 | Livingston | ................. | 47/65.9 |

U.S. PATENT DOCUMENTS

| 8,522,476 B2 | * | 9/2013 | Hawkinson et al. | ........... | 47/65.8 |
| 2003/0056432 A1 | * | 3/2003 | Prevost | ........... | 47/1.01 F |

FOREIGN PATENT DOCUMENTS

DE 3936264 A1 * 5/1991

OTHER PUBLICATIONS www.weedguru.com, pp. 1, 6-7.
Hydroponic Home Food Gardens, World Press, 1990, Howard M. Resh, pp. 62-69.

\* cited by examiner

*Primary Examiner* — Kristen C Hayes
(74) *Attorney, Agent, or Firm* — Harbin & Hein PLLC

(57) ABSTRACT

A multi-layered gravel hydroponic system comprising at least one trench dug into earth, a sheet of fibrous capillary material laid over the trench, sand that fills the trench, a layer of sedimentary-type pea gravel over the sand and capillary material, and a conduit extending into the sand trench to provide fresh water during watering cycles. When combined, the sand and fibrous capillary layers irrigate seeds and roots imbedded in the pea gravel, which provides the growing nutrients. Because the pea gravel is derived from organic material, its natural composition of various minerals provides a nutrient environment to sustain root growth. The resulting structure replaces the need for soil and fertilizers. By watering beneath the pea gravel, nutrients inherent in the pea gravel travel with the water to evenly feed roots throughout the growing region.

14 Claims, 6 Drawing Sheets

SOIL REPLACEMENT METHOD AND SYSTEM FOR SEED GERMINATION AND AGRICULTURAL GROWING

CROSS-REFERENCE TO RELATED APPLICATION

This invention claims the benefit of U.S. Provisional Application Ser. No. 61/457,254 filed Feb. 11, 2011 in the name of the same inventor hereof.

BACKGROUND

The invention concerns a soil replacement method and system suitable for growing plants. Instead of soil, the invention utilizes a multi-layered gravel hydroponic structure that includes sedimentary-type organic pea gravel to provide both support and nutrients for plant growth in an indoor or outdoor environment.

Soil provides a traditional growing environment for vegetation and generally requires annual placements of nutrients and fertilizers to sustain growth. Water, air (i.e., oxygen) and temperature are required for seed germination. Nutrients are not generally needed at this stage since seed pods contain an initial supply of nutrients. After the roots sprout by breaking through the seed coat, plant growth ensues via photosynthesis by consuming water, air (e.g., nitrogen and oxygen), and nutrients. With soil, weeds are a constant problem and often require herbicides for their control or suppression. Soil degradation, especially with consumable crops, also reduces yield over time, pollute watersheds, and contribute to land erosion. In addition, poor soil conditions require increased watering and thus increased costs. Water escapes faster in soil, especially during droughts, which cause the surface of the ground to crack letting even more precious water evaporate into the atmosphere.

Hydroponic systems that grow plants in nutrient solutions eliminate soil but require constant pumping of water and nutrients to support plant growth. Such systems also require nutrient feeding equipment, frequent cleaning of waste buildup, and continuous maintenance to pump nutrient-enriched water to the roots. Prior hydroponic and/or plant cultivation systems are described in U.S. Pat. No. 8,001,721; 7,485,171; 5,557,885; 4,584,791; 4,630,394; 4,329,812; 4,399,634; and 4,148,155. Unlike the present invention, prior hydroponic systems utilizing gravel are not known to employ sedimentary-type organic rock, but instead, utilized metamorphic and igneous type rocks that were devoid of nutrients. A gravel hydroponic system in accordance with the present invention, on the other hand, is completely natural, does not require nutrient solutions and needs little care and maintenance.

Several attempts have been made in the past to facilitate seed germination and plant growth. U.S. Pat. No. 4,067,712 to Willard, for example, discloses the use of a catalyst mixed with soil to enhance seed germination. U.S. Pat. No. 4,171,968 to Farone discloses treating seeds with a surfactant in order to improve their germination. U.S. Pat. No. 4,140,421 shows an underground piping system to provide watering of a growing region.

SUMMARY

According to a first aspect of the present invention, there is provided a multi-layered hydroponic soil replacement system for providing seed germination and growing of plants that comprises a base region such as earth soil to host the growing system, a sand layer to provide a water retention medium that supplies water or moisture to plant roots, a layer of sedimentary type organic-derived pea gravel disposed over the sand layer to enable aeration of implanted seeds for germination and to provide support and aeration of roots where the pea gravel layer has a thickness range to allow roots to extend into and/or near the sand layer in order to draw moisture, a layer of capillary fabric-like material disposed over the base region to disperse moisture about the sand layer, and a conduit or other watering system to supply water to the sand layer whereby to provide a soil replacement system that facilitates seed germination and subsequent plant growth. A pea gravel layer of about two to five inches thick accommodates most plants and being derived from, fully or partially, decayed organic sedimentary type rock obtained from river, lake, or sea beds. The capillary material may comprise lawn fabric. The conduit to supply fresh water may comprise a water pipe extending into the sand layer, or a water-permeable, porous, or perforated hose extending within and/or along the sand trenches for supplying water to the sand.

In a refinement of the invention, the said base region hosting the multilayered structure comprises a series of elongated trenches dug into earth where sand fills trench trenches. A layer of capillary material overlaps the base region and extends into the trenches from trench to trench whereby to draw moisture from a lower and/or an upper regions of the sand in order to provide moisture for roots.

According to another aspect of the invention, in a multi-layered gravel hydroponics system having a moisture retention medium for holding and supplying water to roots of plants, a capillary medium to disperse moisture via capillary action about the roots and moisture retention medium, and a conduit to supply fresh water to the moisture retention medium; there is provided pea gravel derived from, at least in part, sedimentary organic-based rock obtained from a sea, lake, or river bed for use in structurally supporting and providing nutrients to roots of plants in a multilayered gravel hydroponic system. Such pea gravel may range in size between two and ten millimeters.

In a further aspect of the invention, there is provided pea gravel being fully or partially derived from sedimentary rock including organic matter for use in a multilayered gravel hydroponic system comprising a capillary medium to disperse water about a growing region; a moisture retention medium comprising a sand-like material having a fineness to retain moisture for at least several days between water cycles; wherein the pea gravel is distributed over the moisture retention medium and the capillary medium, and wherein the pea gravel has a thickness commensurate with the length of roots of plants being grown. This arrangement provides aeration of seeds in a moist environment to allow germination and also allows aeration, moisture, nutrients, and support for roots.

In accordance with another aspect of the invention, there is provided a multi-layered gravel hydroponic soil replacement structure to grow plants, wherein the structure comprises a base region to host the structure; a fibrous water dispersion layer having a capillary property and fiber density to provide a water flow rate therethrough of at least a few feet per minute when saturated with water; a moisture retention layer comprising a sand-like material of a fineness to retain moisture for at least several days between watering cycles under ambient weather conditions; and a gravel layer that includes organic sedimentary rock disposed over the moisture retention and dispersion layers to enable aeration of seeds in a moist environment for germination and to provide aeration, nutrients, moisture and support for roots of seeds, wherein the gravel layer has a thickness, e.g., two to three inches, commensurate with the type of plant being grown to allow said roots to extend into or near said moisture retention layer to draw moisture therefrom. This arrangement may include a conduit to supply water to the moisture retention layer so that when saturating an area thereof during a watering cycle, water flows to surrounding regions of the sand. The desired flow rate is determined according to the size of the planting regions. For large planting regions, a higher flow rate is desired.

The conduit may extend into the sand or throughout the moisture retention layer and may comprise a flexible water permeable or perforated hose. The fibrous dispersion layer may comprise a sheet of fabric. The fabric is used to spread the water evenly from beneath the gravel. The fabric also prevents weed growth.

According to another aspect of the invention, there is provided a commercially grown plant produced by the steps of providing a growing region exposed to natural or artificial sunlight; laying sand over said growing region where the sand has a fineness to retain moisture for multiple days, e.g., five to fifteen days, between watering cycles when exposed to ambient conditions of the growing region; laying pea gravel over the sand to a thickness commensurate with length of roots of said plant being grown where the pea gravel comprises sedimentary rock derived from organic matter; implanting seeds in the pea gravel; and performing at least one watering cycle by providing water to the sand utilizing a conduit whereby to provide moisture to and flushing of the sand with fresh water.

In a further refinement of the foregoing aspect, an additional layer of capillary material is interposed between the sand layer and pea gravel to draw moisture from a lower region to an upper region of the sand. In addition, the conduit may extend along the sand layer and is porous, perforated, or includes a series of orifices to supply water to said sand. The sand has a thickness to retain moisture for at least several days between watering cycles, and the thickness of the pea gravel layer is between one and five inches, more or less, but preferable between two and three inches.

The growing region may be outdoors or indoors (i.e., a greenhouse), and ambient conditions are those conditions encountered by the plant.

In yet another embodiment of the invention, there is provided a soil replacement system for seed germination and plant growing comprising at least one trench dug into earth, a sheet of fibrous capillary material laid over the trenches, sand disposed over the capillary material which fills the trenches, a layer of pea gravel disposed over the sand and capillary material, and a conduit extending into the sand trenches to provide fresh water to the sand during a watering cycle.

In yet another aspect of the invention, there is provided a method of growing a plant comprising the steps of digging at least one trench into a growing region (e.g., earth), placing a layer of capillary material over the trenches, filling the trenches with sand over the capillary material, placing pea gravel over the sand and capillary material, implanting seeds into the pea gravel, and watering the growing region through said sand.

These and other aspects of the invention will become apparent upon review of the following description taken in connection with the accompanying drawings.

DESCRIPTION OF ILLUSTRATIVE EMBODIMENT

Figure 1:
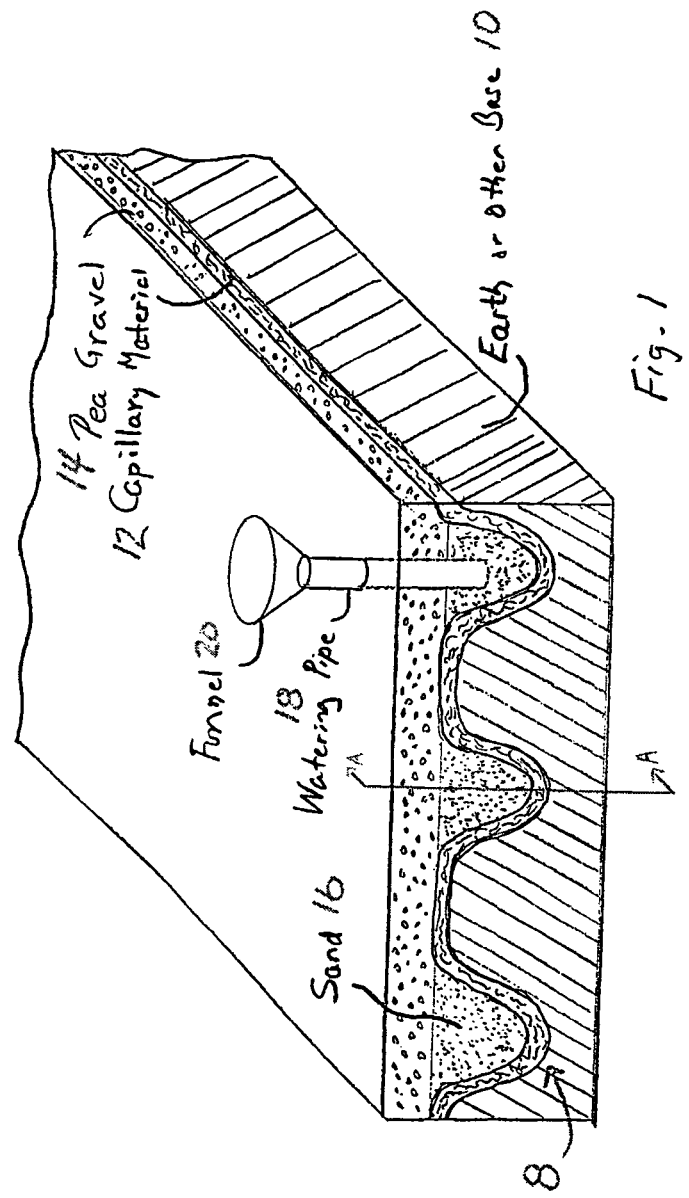
FIG. 1 shows an exemplary multilayered growing region incorporating the principles of the present invention.

Distinction of the present invention over the prior art lies in the functionality of the respective layers when combined in the multi-layered structure. The organic pea gravel layer provides the combined functions of root aeration, plant support and nutrient feeding. The capillary and sand layers perform the functions of dispersing water and retaining moisture. Coarseness of the fibrous or capillary layer determines the extent and rapidity of water dispersion over a planting area. Fineness of the sand in the sand layer defines the extent of aggregate surface area available for moisture retention, as well as longevity of such moisture retention, which typically spans one or two weeks between watering cycles. Thus, the overall functions of the multi-layered structure of the inventive gravel hydroponic system provide plant support, aeration, inherent nutrient feeding, water dispersion, and moisture retention.

Natural organic minerals within sedimentary-type pea gravel provide the nutrients for plant growth thereby eliminating or reducing the need for fertilizers. Consequently, soil degradation and other soil detriments are eliminated. A growing region, such as that illustrated in FIG. 1, may be defined in an earth or other base 10, soil or non-soil base, including open fields, indoors, gardens, greenhouses, or the like. In the illustrated embodiment, a series of trenches 8 are dug into the earth and a layer of fibrous capillary material 12 is laid into and overlaps the trenches 8, which are filled with rows of sand 16. A layer of pea gravel 14 is then placed over the entire structure. In a small garden system a watering pipe 18 having a funnel 20 may be inserted into the sand to allow watering.

Rock may be classified as metamorphic, sedimentary and igneous. Rock type of pea gravel used in the present invention is sedimentary, which is formed in water environments over thousands or millions of years. Sedimentary rock is generally composed of decayed organic material within water that has settled and layered itself into rock. There are three types of sedimentary rocks: Clastic, Chemical and Organic. The present invention uses organic rock, which leaches organic material or nutrients to plants when impacted with water. When impacted with water, a chemical action occurs where molecules of water merge with molecules of the rock to create a nutrient enriched water and support system. Water enables these organic rocks to leach out nutrients. Since the nutrients inherently reside in the rock material, nutrients may be leached out over hundreds of years.

Other aspects of the invention create an even and consistent moist or wet environment surrounding the rocks to sustain nutrient feeding of roots. Sand provides a water storage area which enables the organic rocks to sustain a moist environment. The fabric is used to help spread the water evenly beneath the gravel and to inhibit weed growth. Thickness of the fabric layer ranges between two and ten millimeters for cotton based fabric. Lawn fabric may be used for the fibrous or fabric layer.

There are two types of lawn fabric may be used—gray industrial type and the garden cloth type. The cloth type is referred to as the capillary fabric because it better transfers or carries water. Plastic based lawn fabrics should not be used. The gray industrial fabric has tighter knit and will hold the water longer while the black fabric will transfer the water across the fibers. In actual use, one may cut the necessary area of the gray professional lawn fabric, and then lay the gray fabric in the planting region so that it covers the entire area and into the trench. The grey fabric holds water longer than the black fabric, but it also eventually allows water to soak through. Next, the black fabric is laid on top of the gray fabric so that the black fabric lies into the trench as well. The capillary nature of the black fabric will carry water to everywhere it is laid. Next, sand is poured into the trench so that it completely fills the trench to the top. Level the sand so that it is flat and then cover the sand with a strip of the black fabric. The sand can taper off at the top. This will allow the capillary nature of the sand to spread the water more easily. Next, insert a PVC pipe at one end of the sand trench. A four-by-four foot planting region, for example, only needs one entry point of water. Larger areas will need a pipe every six to eight feet. Also the fabric layer may be fortified to enhance water support and have several layers of fabric so that water drains slower through the fabric. Other fabric or fibrous or capillary material and thicknesses providing water dispersive properties may also be used.

Ability of sand, fabric and gravel allow the gravel bed to evenly dispersed moisture and feed of nutrients to root systems. Sand having a median particle size of about 0.25 mm (e.g., beach sand), when watered, provides a sustained moist environment around the rocks for seven to ten days so that root systems can spread and grow. Other sands may also be used.

The thickness of the pea gravel layer is important. Too thick and there is insufficient moisture reaches plant roots. Too thin and there is not enough room for roots to grow. Thus, in a typical application, the layer of organic pea gravel is about one to three inches in thickness, more or less. When seed pods are placed in the pea gravel layer, the thickness of the pea gravel layer should accommodate the length of subsequent root growth for the type of plant being cultivated so that the roots, when grown, extend down through the pea gravel into or near the sand layer or fabric to draw water/moisture therefrom. The roots themselves attached to the surface of the pea gravel to draw nutrients. River, lake, and sea bed pea gravel, for example, is composed of limestone, calcite, dolomite, calcium, silica, iron oxide, foraminifera, hydrocarbons and coquina. Pea gravel size may range from two millimeters up to about sixty-four millimeters, but is generally in the range of three to ten millimeters, or the size of a garden pea.

The roots however do not necessarily extend through the pea gravel to the sand layer. The sand layer may optionally be covered by another fabric layer so the roots do not reach the sand, but instead crawl along the fabric layer and also intertwine with the rocks as they grow.

Nutrient matter within sedimentary pea gravel rock is composed primarily of calcium carbonate ($CaCO_3$) in the form of the mineral calcite which is formed by the precipitation of calcium carbonate from lake or ocean water. A most common form of this type of rock is river pea gravel which is one of the many varieties of limestone that span the ocean floors. Limestone is by definition a rock that contains at least 50% calcium carbonate in the form of calcite by weight. Limestone contains at least a few percent of other materials. These can be small particles of quartz, feldspar, clay minerals, pyrite, siderite and other minerals. Limestone can also contain large nodules of chert, pyrite or siderite. The calcium carbonate content of limestone gives it a property that is often used in rock identification—it effervesces in contact with a cold solution of 5% hydrochloric acid. The natural nutrient matter of the pea gravel limestone provides sustained nutrient substances for root growth thereby reducing or eliminating any use or need for fertilizers. The mineral content of the river pea gravel provides a natural fertilizer for growing plants.

A nutrient-laden pea gravel plant growing system should maintain its effectiveness for at least ten years. Over time, e.g., every 10 to 15 years or so, the effectiveness of the gravel to feed plants may experience degradation and may need replacement.

The organic pea gravel growing environment provides sustained growth for a variety of vegetation from seed at pH ranges of (7.0 to 7.8) with high phosphorous and low potassium levels. The capillary irrigation system of the present invention significantly increases watering efficiency, water conservation, and water distribution.

To provide watering for an agricultural growing region, as shown in exemplary embodiment of FIG. 1, a layer of fibrous material is laid over generally parallel sand trenches which are space about every two to four feet, more or less, in the region depending on type of harvesting mechanism. Three feet row spacing is adequate for manual walking or tractor treads. In one application, the trench is about ten inches wide, more or less, and about ten to twelve inches deep, more or less. Multiple trenches may be deployed in an earth-based gravel hydroponic system. Water is then supplied to the sand trenches through a series of PVC or other pipes that forms a piping network in the agricultural region. Rain water, for example, may be delivered to the sand trenches for storage through the pea gravel layer, or alternatively, via one or more piping, funnel or other water capturing devices.

The sand regions may also be water by conventional watering techniques applied to the agricultural region.

One full watering every four to five days can supply adequate water to a ten feet by ten feet region of a pea gravel garden area. Water that passes through the system is filtered by the sand, distributed evenly underneath the pea gravel on the capillary material, providing roots with continuous appropriate levels of water. With soil, water is absorbed by the soil itself whereas with pea gravel water absorption is relatively insignificant. The fibrous capillary material greatly reduces weeds in a planting area. The fibrous material when laid is stapled and then covered with two to four inches of gravel, reducing the opportunity for weed growth. Airborne transmitted weed pollination, however, still exists. This growing system is suitable for growing the following vegetable: okra, yams, blackeye peas, swiss chard, lettuce, string beans, lima beans, zucchini, yello squash, tomatoes, tunips, turnip greens, carrots, onions, garlic, parsley, and bell peppers. The invention has grown the following flowers: Zinnias, cosmos, marigolds, iris, and daffodils. The invention has also grown the following fruit: Strawberries and watermelons.

The invention may be practice in any planting area, commercially or a home. In a home garden location, for example, a planting area may be lined with cinder blocks to act as a retaining wall. Next, one or more trenches are dug the length of the garden bed. The trench may be eight to ten inches deep, more or less. Within the enclosed outlined planting area, a fibrous capillary material such as lawn fabric is laid on the ground (planting area) and in the trench. The trench is filled with conventional sand (e.g., beach sand, play sand, etc.) so that the sand is level with the top of the trench. Next, three to five inches of pea gravel, such as brown riverbed limestone pea gravel, is laid over the planting area. Granite-based pea gravel may also suffice to provide nutrients. In addition, a mixture of pea gravel and soil may provide a nutrient-rich growing environment. Average diameter of pea gravel includes the size that is commercially available, or larger or smaller diameter to a certain degree. A three-inch PVC pipe is placed on each end of the trench in the sand, penetrating through the pea gravel so that the sand is at the bottom of the PVC pipe. To catch rain or to receive a supply of water, a fourteen inch funnel is placed to on the PVC pipes along each trench. For home environment one sand trench is appropriate. In commercial applications, a sand trench is dug approximately every twenty-five feet. In home applications, a retaining wall may be used to hold up the pea gravel garden but not necessarily with commercial applications. In commercial usage, one may slope down from five to one inch to spread across approximately ten to fifteen feet between the five-inch pea gravel mounds and the edge.

When water is added to the PVC pipe, it will flow down the tube to the sand then seep slowly to the fabric. The capillary nature of the fabric and sand will spread water beneath the pea gravel to everywhere the lawn fabric was laid. Because the sand is about two to five inches below the surface, the sun and wind does not evaporate water stored in the sand. Water or moisture then flows slowly up the pea gravel to the seed and root systems to provide moisture and nutrients. Other watering systems may also be provided, such as an underground network of piping that supplies water to sand trenches, either through the fabric layer or the sand layer.

Water and leached nutrients from the organic pea gravel create a moist environment to sustain growth of vegetation. The nutrients from the pea gravel provide the calcium, potassium, and phosphorous necessary to facilitate root development. Limestone gravel derived from coral reefs may also provide an adequate growing environment. The simple addition of a funnel to the top of the PCV pipe will provide rain water catchment, which can sustain water needs in the gravel bed for several days. Since the pea gravel is composed of rock-like material, nutrients are provided for the life of the rock.

Once the pea gravel is laid, the gravel bed is ready of planting. Plant seeds one to three inches below the top surface of the gravel depending on the type of seed. Water the funnel until full, once or twice per week.

Figure 2:
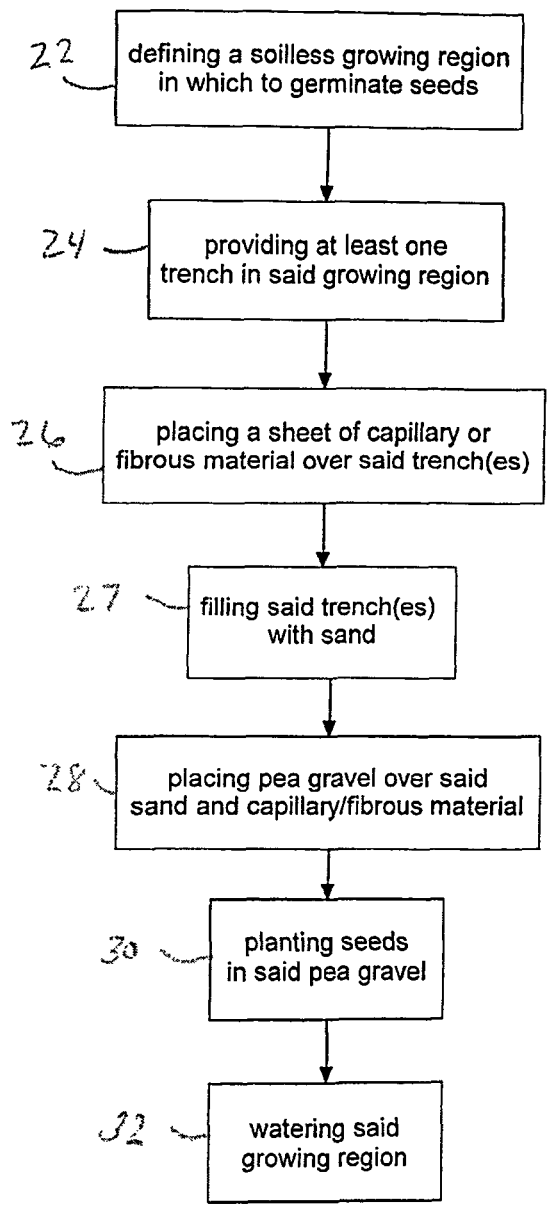
FIG. 2 illustrates steps of a method in accordance with the present invention.

FIG. 2 illustrates a method in accordance with the invention. Such a method comprises a defining step 22 a soilless growing region, a step 24 of providing at least on trench in the growing region, step 26 of placing a sheet of capillary or fibrous material over the trench, step 28 of filing the trench with sand, step 30 of placing organic pea gravel over the sand and capillary/fibrous material, planting seeds in the pea gravel, and step 32 of watering the growing region to germinate and grow the planted seeds. Optionally, an additional layer of capillary or fibrous material may be laid over the sand, between the sand and pea gravel layers to more effectively spread moisture.

Figure 3:
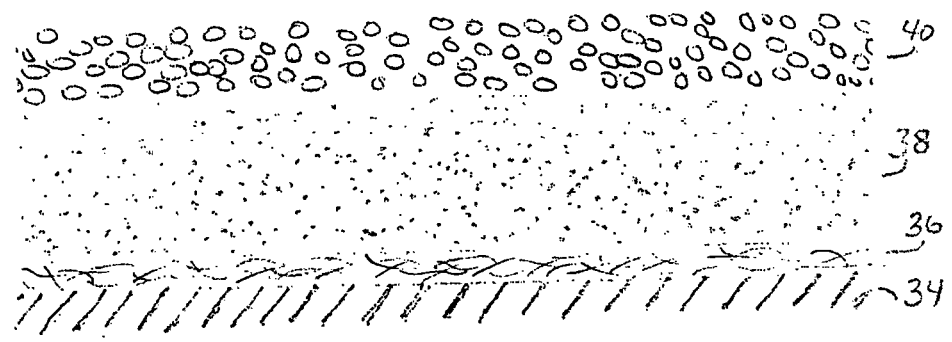
FIG. 3 shows a planar cross-sectional cut along the plane indicated by A-A of the multilayered structure of FIG. 1.

FIG. 3 shows a planar cross-cut along plane identified by A-A of FIG. 1. This shows a base 34, such as an earth trench, a fibrous capillary layer 36 to disperse water, a sand layer 38 for water retention, and a gravel layer 40 to provide the aforementioned functions.

Figure 4:
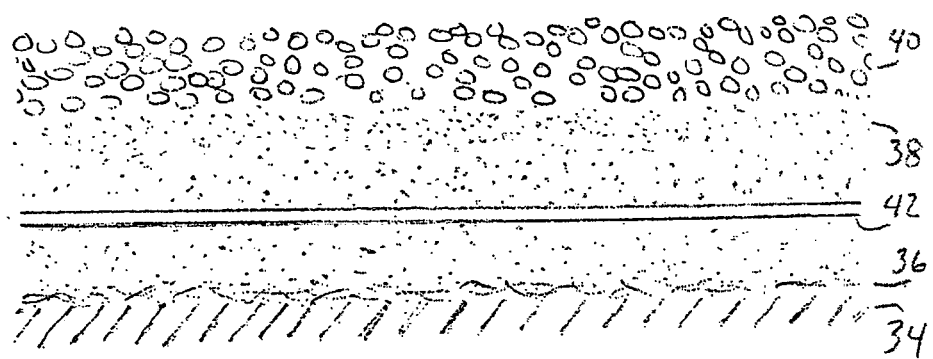
FIG. 4 shows another embodiment of the invention including a water permeable or perforated conduit that coextends into or along sand trenches.

FIG. 4 shows an alternative watering system where a conduit 42 is laid into the sand layer 38. The conduit 42 may include a series of orifices to inject water into the sand layer, or may comprise a perforated, porous or water permeable hose to supply water to the sand. The conduit 42 connects to a water source (not shown) which may be pressurized or gravity-fed. This arrangement may be more suitable for larger commercial applications of the invention.

Figure 5:
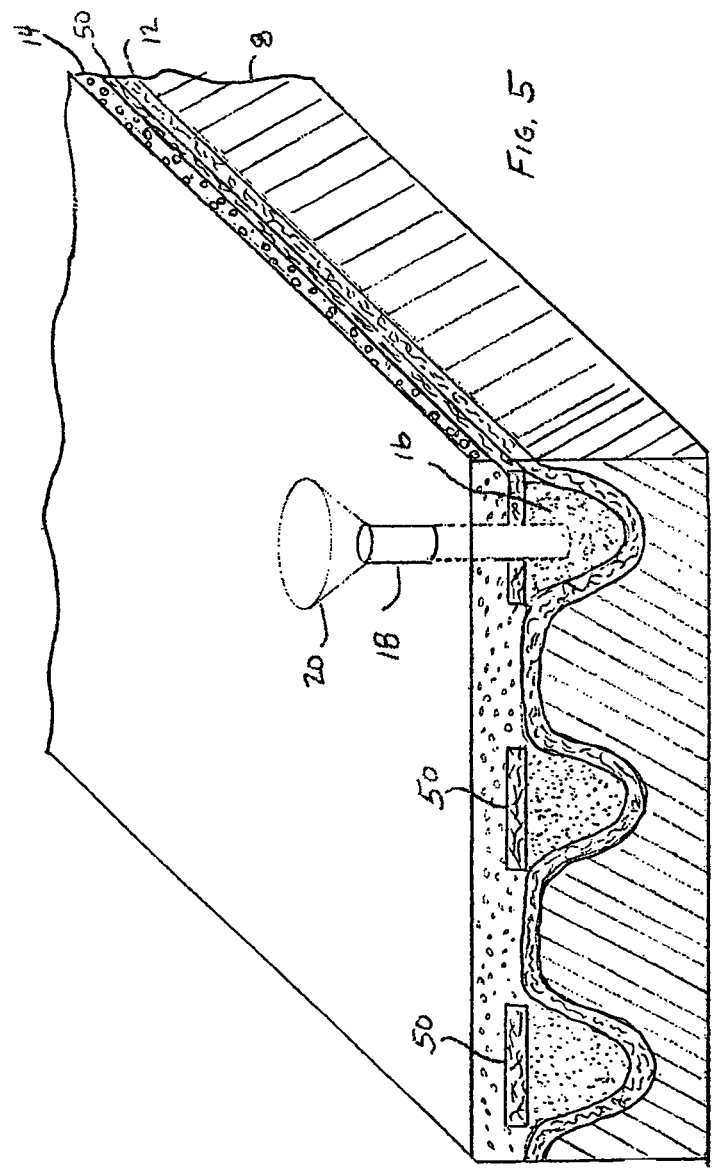
FIG. 5 shows an optional embodiment of the invention of FIG. 1 wherein an additional layer of capillary fabric material is laid over sand trenches or a sand layer.

FIG. 5 shows an optional embodiment of the invention of FIG. 1 wherein an additional layer 50 of capillary fabric material is laid over sand trenches or sand layer. One or more sand trenches and/or additional fabric strips may be employed in a growing region. This helps to more evenly spread moisture underneath the pea gravel layer by drawing moisture or water from the sand beneath the additional fabric layer 50. The additional fabric layer 50 may cover the trenches only (as shown), or may comprise a larger sheet spread over the entire growing area by overlapping multiple trenches or covering an entire non-trench growing region. The additional fabric layer 50 also helps prevent weed growth, provides an insect barrier, and provides additional support for plant roots extending downwardly through the pea gravel.

Figure 6:
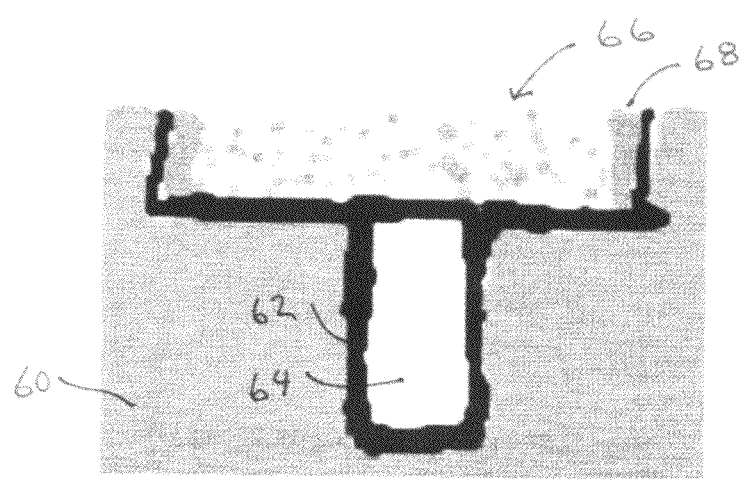
FIG. 6 shows a gravel bed structure in accordance with the present invention that may be used in a large scale farming operation.

FIG. 6 shows a gravel bed cross-section of a trench structure that may be used in a large scale farming operation. Trench spacing is about three feet. The trench structure is dug into earth 60 that hosts a series of sand trenches 64 wherein fabric 62 lies between earth 60 and sand 64. The sand trench 64 is about four to twelve inches deep depending on type of plant being grown. Fabric 62 also extends over earth 60 laterally underneath the layer of gravel 66, which is preferably about two to five inches thick—preferably three inches thick. A retaining wall 68 may flank the sides of the rows of gravel 66.

In the exemplary embodiments, a fibrous material like lawn fabric performs the function of enabling water to flow or disperse over a wide area under the sand. The sand layer functions to absorb and hold water/moisture for plant growth. The organic, sedimentary type pea gravel (e.g., river or sea bed pea gravel) performs the function of providing nutrients and structurally supporting a root system for the plant. Other materials that perform these functions may be substituted without departing from the scope of the invention. Accordingly, the invention includes such modification and substitutions as may come to those skilled in the art.

I claim:

1. A multi-layered hydroponic soil replacement system for providing seed germination and growing of plants, said system comprising:
   a base region to host said growing system;
   a sand layer to provide a water retention medium that supplies water to roots of said plants;
   a layer of sedimentary organic-derived pea gravel disposed over said sand layer to enable aeration of implanted seeds for germination and to provide support and aeration of roots, said layer of pea gravel having a thickness range to allow said roots to extend into or near said sand layer to draw moisture for plant growth;
   a layer of capillary material disposed over said base region to disperse moisture about said sand layer; and
   a conduit to supply water to said sand layer whereby to provide a soil replacement system that facilitates seed germination and subsequent plant growth.

2. The invention of claim 1, wherein said pea gravel comprises decayed organic material obtained from river, lake, or sea beds.

3. The invention of claim 2, wherein said layer of pea gravel is two to three inches thick.

4. The invention of claim 3, wherein said base region comprises a series of elongated trenches dug into earth, said sand layer fills said series of trenches, and said layer of capillary material overlaps said base region and extends into said trenches from trench to trench whereby to draw moisture from a lower region of an upper region of said sand layer to provide moisture for said roots.

5. The invention of claim 4, wherein said layer of capillary material comprises a fibrous material.

6. The invention of claim 4, wherein said conduit comprises a water permeable, porous, or perforated conduit extending within or along said sand trenches for supplying water to said sand layer.

7. In a multilayered gravel hydroponic system having a moisture retention medium for holding and supplying water to roots of plants, a capillary medium to disperse moisture via capillary action about said roots and moisture retention medium, means to enable fresh water to reach said moisture retention medium; and pea gravel derived from sedimentary organic-based rock obtained from a sea, lake, or river bed for use in structurally supporting and providing nutrients to roots of said plants in said multilayered gravel hydroponic system.

8. The invention of claim 7, wherein said pea gravel includes gravel having a size range between two and ten millimeters.

9. A multi-layered gravel hydroponic soil replacement structure to grow plants, said structure comprising:
   a base region to host said structure;
   a fibrous water dispersion layer having a capillary property and fiber density to provide a water flow rate therethrough of at least several feet per minute when saturated with water;
   a moisture retention layer to retain moisture for at least several days between watering cycles under ambient weather conditions; and
   a gravel layer that includes organic sedimentary rock disposed over said moisture retention and dispersion layers to enable aeration of seeds in a moist environment for germination and to provide aeration, nutrients, moisture and support for roots of said seeds, said gravel layer having a thickness commensurate with the type of plant being grown to allow said roots to extend into or near said moisture retention layer to draw moisture therefrom.

10. The invention of claim 9, further including a conduit to supply water to said moisture retention layer.

11. The invention of claim 10, wherein said conduit extends throughout said moisture retention layer and comprises a flexible water permeable or perforated hose.

12. The invention of claim 11, wherein said fibrous water dispersion layer comprises a sheet of fabric.

13. A soil replacement system for seed germination and growing comprising:
   at least one trench dug into earth,
   a sheet of fibrous capillary material laid over said at least one trench,
   sand disposed over said capillary material to fill said trench,
   a layer of pea gravel disposed over said sand and capillary material, and
   a conduit extending into said sand trench to provide fresh water to said sand during a watering cycle.

14. A method of growing a plant comprising the steps of:
   digging at least one trench into a growing region,
   placing a layer of capillary material over said trench,
   filling said trench with sand over said capillary material,
   placing pea gravel over said sand and capillary material,
   implanting seeds into said pea gravel, and
   watering said growing region through said sand.

\* \* \* \* \*